United States Patent [19]
Degier et al.

[11] Patent Number: 5,272,882
[45] Date of Patent: Dec. 28, 1993

[54] PORTABLE RECYCLE/RECOVERY/CHARGING SYSTEM WITH RECONFIGURABLE COMPONENTS

[75] Inventors: Randall L. Degier, La Crosse; Richard L. Groth, Onalaska; Stephen T. Kerr, La Crosse, all of Wis.; Ralph C. Mullally, La Crescent, Minn.; Patrick D. Pruse; Robert J. Roth, both of La Crosse, Wis.

[73] Assignee: American Standard Inc., New York, N.Y.

[21] Appl. No.: 817,019

[22] Filed: Jan. 3, 1992

[51] Int. Cl.$^5$ ............................................. F25B 45/00
[52] U.S. Cl. ................................... 62/77; 62/85; 62/292; 62/475
[58] Field of Search ............... 62/292, 149, 77, 475, 62/85

[56] References Cited
U.S. PATENT DOCUMENTS

| | | | |
|---|---|---|---|
| Re. 33,212 | 5/1990 | Lower et al. | 62/126 |
| 4,285,206 | 8/1981 | Koser | 62/126 |
| 4,441,330 | 4/1984 | Lower et al. | 62/149 |
| 4,768,347 | 9/1988 | Manz et al. | 62/149 |
| 4,805,416 | 2/1989 | Manz et al. | 62/292 |
| 4,809,520 | 3/1989 | Manz et al. | 62/292 |
| 5,005,369 | 4/1991 | Manz | 62/195 |

*Primary Examiner*—John M. Sollecito
*Attorney, Agent, or Firm*—William J. Beres; William O'Driscoll; Peter D. Ferguson

[57] ABSTRACT

A portable, refrigerant recycle/recovery/charging system comprising: a storage tank; a low pressure refrigeration system; and a housing. The housing includes liquid, vapor, pump and condenser sections. The liquid section has a liquid inlet, a liquid outlet and a liquid conduit connecting the liquid inlet and the liquid outlet where the liquid conduit includes a liquid flow control device and a liquid condition sensing device. The vapor section has a vapor inlet, a vapor outlet, and a vapor conduit connecting the vapor inlet and the vapor outlet where the vapor conduit includes a vapor flow control device and a vapor condition sensing device. The pump section has a pump inlet, a pump outlet, and a pump conduit connecting the pump inlet and the pump outlet where the pump conduit includes a pump. The condensing section has a condensing inlet, a condensing outlet, and a condensing conduit connecting the condensing inlet and the condensing outlet where the condensing conduit includes a condenser.

5 Claims, 12 Drawing Sheets

FIG. 1
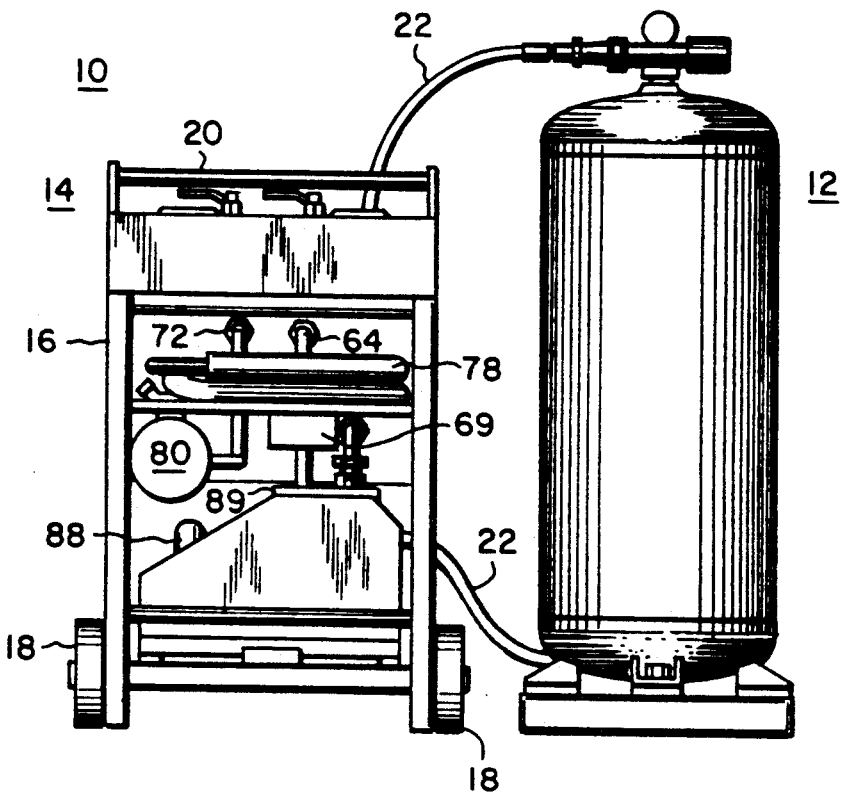
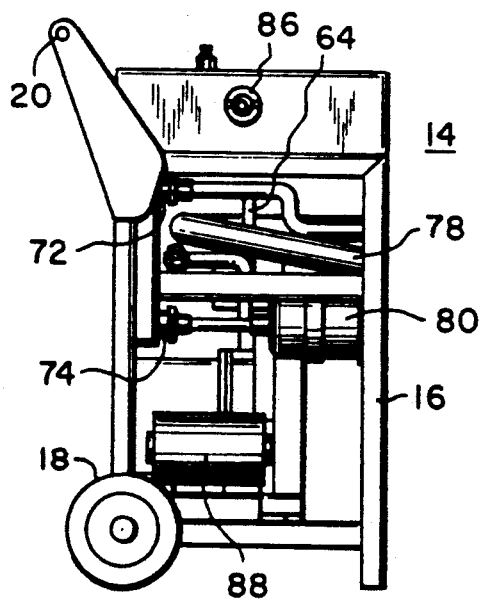
FIG. 2
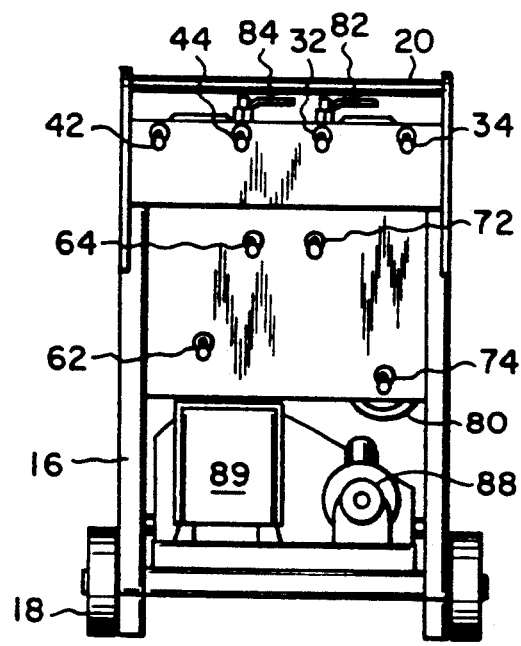
FIG. 3

1

PORTABLE RECYCLE/RECOVERY/CHARGING SYSTEM WITH RECONFIGURABLE COMPONENTS

BACKGROUND OF THE INVENTION

The present invention is directed to a refrigerant recycle/recovery/charging system. More specifically, the present invention is directed to a highly versatile yet portable refrigerant recycle/recovery/charging system which allows a single system to perform the evacuation, charging, recovery and recycling of refrigerant in a low pressure refrigeration system.

Previous recycle/recovery type systems have been typically directed to high pressure refrigeration systems such as those used in automobile air conditioning units. The previous systems are designed so that an untrained service man can service an automobile air conditioning unit by simply attaching a few hose connections and initiating an automatic process. Such a system is shown in U.S. Pat. No. 4,805,416 to Manz et al. This system is intended for operation by relatively unskilled personnel with minimum operator intervention. To accomplish this, a complex assembly of expensive valves, gauges, and sensors is used under the control of an electronic controller. However, in each embodiments shown in FIGS. 1-8 of this patent, the required sequence of an inlet 32, a strainer 30, a pressure switch 42, a valve 28, 78, a heat exchange/oil separation unit 26, a compressor 22, the heat exchange/oil separation unit 26, a pressure switch 70 and a container 58 limit the versatility of this unit while contributing greatly to its expense.

SUMMARY OF THE INVENTION

It is an object, feature and an advantage of the present invention to solve the problems of prior art refrigeration recycle/recovery/charging systems.

It is an object, feature and an advantage of the present invention to provide a portable recycle/recovery/charging system for low pressure refrigeration systems.

It is an object, feature and an advantage of the present invention to provide a portable refrigerant recycle/recovery/charging system for refrigeration systems containing large volumes of refrigerant.

It is an object, feature and an advantage of the present invention to provide a refrigerant recycle/recovery/charging system which can be maneuvered by one person in to and out of building maintenance areas.

It is an object, feature and an advantage of the present invention to provide a highly versatile refrigerant recycle/recovery/charging system which combines charging, recovery, evacuation, and other features into a single unit.

It is an object, feature and an advantage of the present invention to provide a highly economical refrigerant recycle/recovery/charging system.

It is an object, feature and an advantage of the present invention to eliminate the plurality of costly valves, gauges, sensors, and connections required by previous refrigerant recovery systems.

It is an object, feature and an advantage of the present invention to prevent the release of refrigerant to atmosphere while operating a refrigerant recycle/recovery/charging system.

It is an object, feature and an advantage of the present invention to recover not only liquid refrigerant but virtually all of the refrigerant vapor from a refrigeration system using a recycle/recovery/charging system.

It is an object, feature and an advantage of the present invention to provide a proper means of recovering contaminated refrigerant from a refrigeration system for decontamination and recycling.

It is an object, feature and an advantage of the present invention to assist owners, operators, and service personnel to conserve and contain refrigerants typically used in low pressure refrigeration systems.

It is an object, feature and an advantage of the present invention to facilitate the transfer and storage of refrigerant charged when repair and maintenance work is performed at low pressure refrigeration installations.

It is an object, feature and an advantage of the present invention to store refrigerant during prolonged shutdown periods.

It is an object, feature and an advantage of the present invention to provide a recycle/recovery/charging system having a vapor section, a liquid section, a pump section and a condenser section where there are no permanent connections between these section.

The present invention provides a portable, refrigerant recycle/recovery/charging system comprising a storage tank; a low pressure refrigeration system; and a housing. The housing includes: a liquid section, a vapor section, a pump section and a condenser section. The liquid section has a liquid inlet, a liquid outlet and a liquid conduit connecting the liquid inlet and the liquid outlet where the liquid conduit includes a liquid flow control device and a liquid condition sensing device. The vapor section has a vapor inlet, a vapor outlet, and a vapor conduit connecting the vapor inlet and the vapor outlet where the vapor conduit includes a vapor flow control device and a vapor condition sensing device. The pump section has a pump inlet, a pump outlet, and a pump conduit connecting the pump inlet and the pump outlet where the pump conduit includes a pump. The condensing section has a condensing inlet, a condensing outlet, and a condensing conduit connecting the condensing inlet and the condensing outlet where the condensing conduit includes a condenser.

The present invention also provides means for removing fluids from the low pressure refrigeration system. The removing means includes first means for arranging the system in a sequence of the low pressure refrigeration system, the liquid section, the condenser section, the storage tank, the vapor section and the pump section. The removing means also includes second means for arranging the system in a sequence of the low pressure refrigeration system, the storage tank, and the vapor section, and third means for arranging the system in a sequence of the low pressure refrigeration system, the liquid section, the storage tank, the vapor section, the pump section, and the storage tank. The removing means also includes fourth means for arranging the system in a sequence of the low pressure refrigeration system, the vapor section, the pump section, the condenser section, the liquid section, and the storage tank, and fifth means for arranging the system in a sequence of the low pressure refrigeration system, the vapor section, the pump section, and an outlet to atmosphere.

The present invention additionally provides means for introducing fluids into the low pressure refrigeration system. The introducing means includes sixth means for arranging the system in a sequence of the storage tank, the vapor section, and the low pressure refrigeration system, and seventh means for arranging the system in a sequence of the storage tank, the liquid section, the low pressure refrigeration system, the pump section, the vapor section, and the storage tank. The introducing means also includes eighth means for arranging the system in a sequence of the liquid section, the storage tank, the vapor section, the pump section, and the low pressure refrigeration system, and ninth means for arranging the system in a sequence of the storage tank, the vapor section, the pump section, the condenser section, the liquid section, and the low pressure refrigeration system.

The present invention further provides means for evacuating refrigerant vapor from the condenser section and means for securing the system after use. The evacuating means includes tenth means for arranging the system in a sequence of the liquid section, the condenser section, the storage tank, the vapor section, the pump section, and the low pressure refrigeration system; while the securing means includes eleventh means for arranging the system in a sequence of the storage tank, the vapor section, the liquid section, and the pump section.

BRIEF DESCRIPTION OF THE DRAWINGS

FIG. 1 is a perspective front view of the refrigerant recycle/recovery/charging system of the present invention.

FIG. 2 shows a side perspective view of the refrigerant recycle/recovery/charging unit of FIG. 1.

FIG. 3 shows a rear view of the refrigerant recycle/recovery/charging unit of FIG. 1.

DETAILED DESCRIPTION OF THE DRAWINGS

Figure 4:
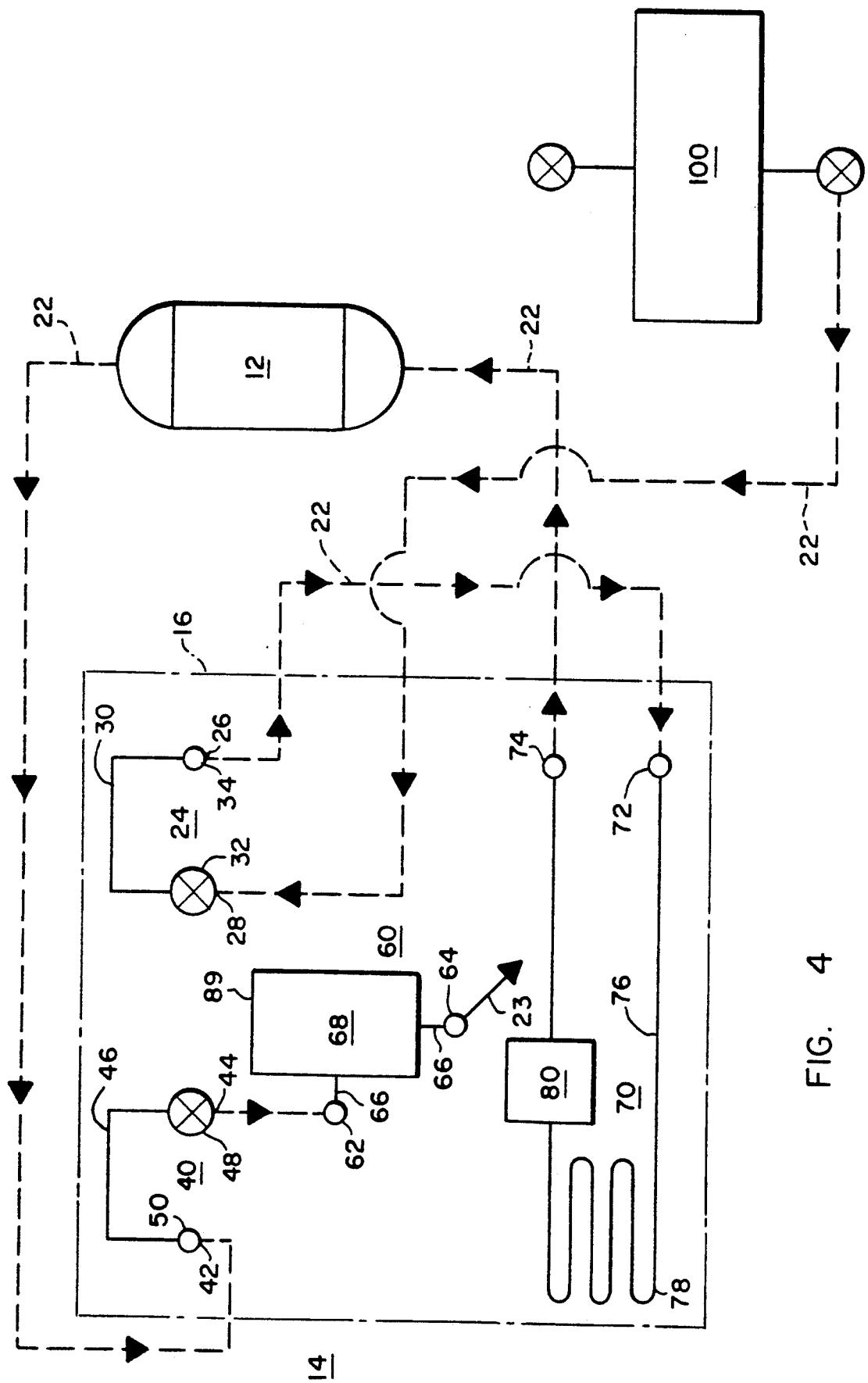
FIG. 4 shows a first circuit arrangement of the present invention arranged to evacuate a storage tank and refrigerant conduit.

The present invention is directed to a refrigerant recycle/recovery/charging system 10 which also includes evacuation capabilities.

FIG. 1 shows the refrigerant recycle/recovery/charging system 10 of the present invention including at least one storage tank 12 and a portable recycle/recovery/charging unit 14. The unit 14 includes a frame 16 supported by a pair of wheels 18, and a handle bar or handle grip 20 for moving the housing 14. The storage tank 12 and the portable unit 14 are joined only by a plurality of refrigerant conduits 22. Each refrigerant conduit 22 typically comprises a hose joining a pair of self sealing quick disconnect couplings. The conduit 22 is also arranged in a variety of arrangements as subsequently discussed in connection with FIGS. 4-14.

Referring to all the FIGS., the housing 14 supports a liquid section 24 having a liquid inlet 26, a liquid outlet 28 and a liquid conduit 30 connecting the liquid inlet 26 to the liquid outlet 28. The liquid conduit 30 includes a liquid flow control device 32 such as a valve, and a liquid condition sensing device 34 such as a pressure gauge. The housing 14 also supports a vapor section 40 having a vapor inlet 42, a vapor outlet 44, and a vapor conduit 46 connecting the vapor inlet 42 and the vapor outlet 44. The vapor conduit 46 includes a vapor flow control device 48 such as a valve, and a vapor condition sensing device 50 such as a pressure gauge.

Additionally, the housing 14 supports a pump section 60 including a pump inlet 62, a pump outlet 64, and a pump conduit 66 connecting the pump inlet 62 to the pump outlet 64. The pump conduit 66 includes a vacuum pump 68. The housing 14 also supports a condensing section 70 including a condensing inlet 72, a condensing outlet 74, and a condensing conduit 76 connecting the condensing inlet 72 and the condensing outlet 74. The condensing conduit 76 includes a water or air cooled condenser 78 and a filter drier 80.

The flow control devices 32, 48 preferably include manually operated valves 82 and 84 respectively. A moisture indicator such as a moisture indicating glass 86 in the liquid conduit 30 is preferably included, as is a visual display (not shown) of the condition sensing devices 34, 50. The housing 14 supports the manually operated valves 82, 84, the moisture indicator 86 as well as any visual displays. The housing 14 also supports a motor 88 within a casing 89 where the motor 88 is operably connected to and motivating the vacuum pump 68.

Figure 13:
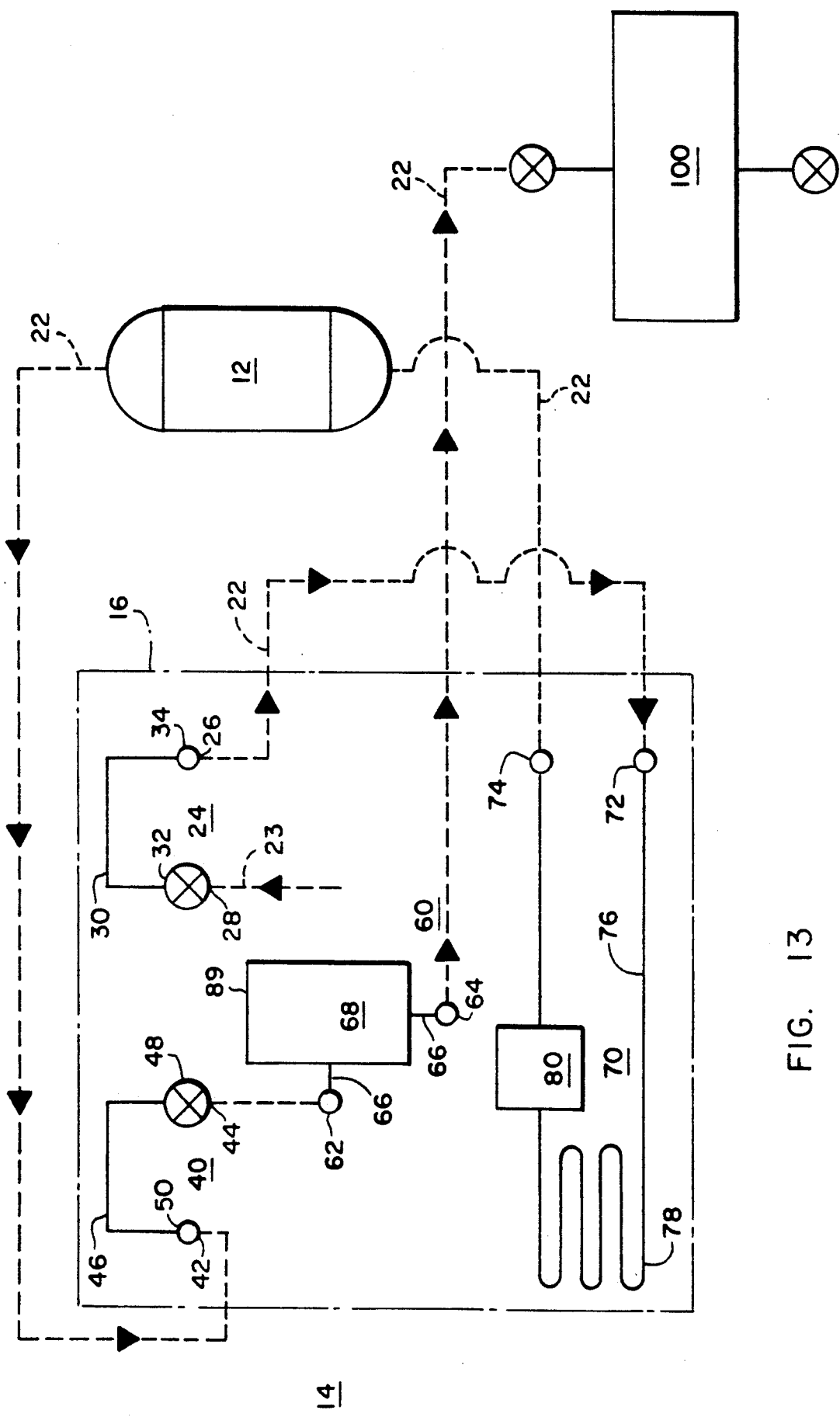
FIG. 13 shows a tenth arrangement of the present invention arranged to evacuate refrigerant vapor from a water cooled condenser, a filter drier, and related refrigerant conduit.
Figure 14:
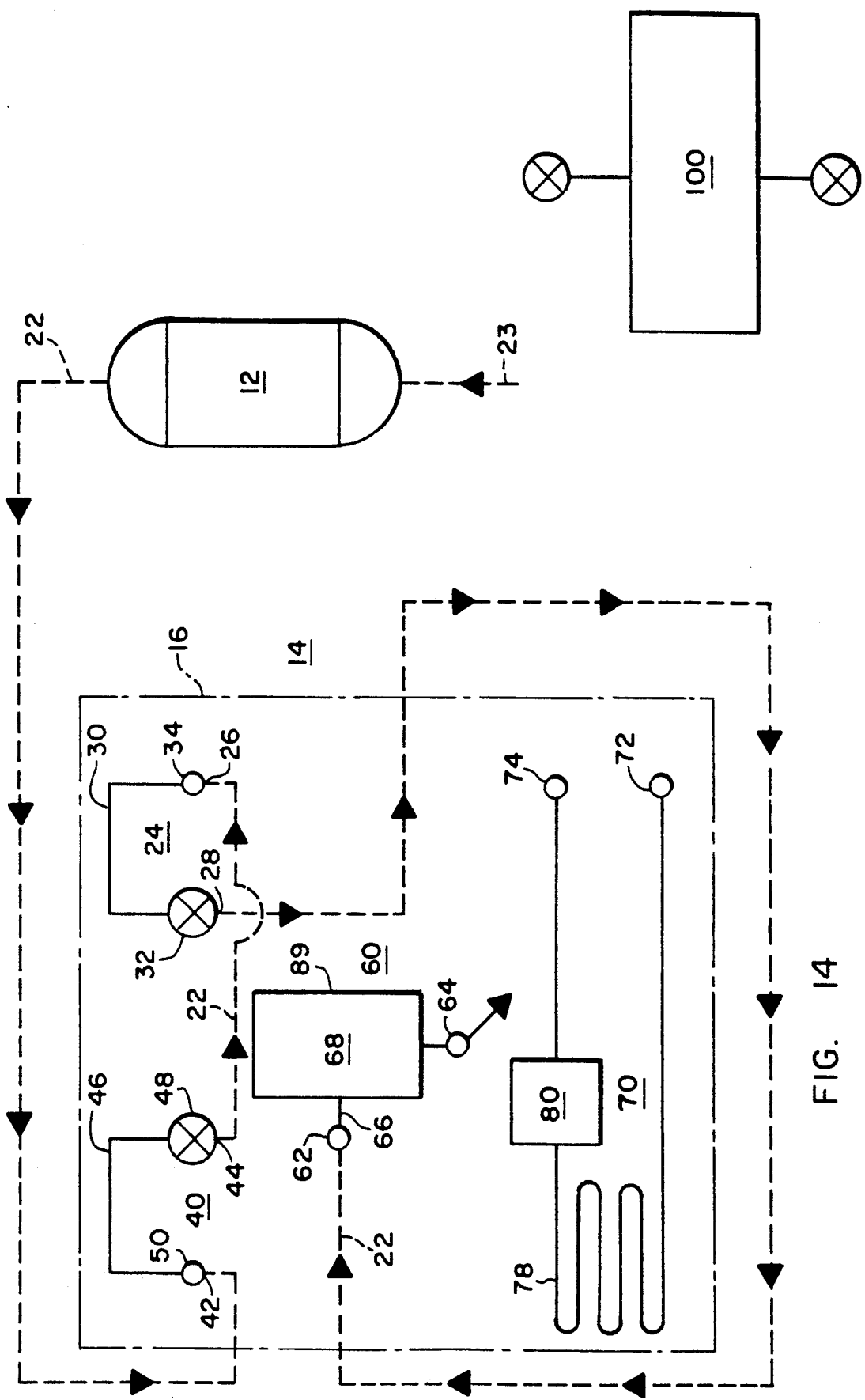
FIG. 14 shows an eleventh arrangement of the present invention arranged to secure the refrigerant recycle/ recovery/charging system after use.

The present invention is directed to means for removing fluids such as refrigerant gases or vapors and refrigerant liquids from a low pressure refrigeration system, and to means for introducing or charging fluids such as refrigerant gases or vapors and refrigerant liquids into a low pressure refrigeration system. The removing means is shown in various arrangements in FIGS. 4 through 8, while the introducing means is shown in various arrangements in FIGS. 9 through 12. Additionally, FIG. 13 shows means for evacuating refrigerant vapor from a water cooled condenser while FIG. 14 shows means for securing the refrigerant recycle/recovery/charging system after use. In each of FIGS. 4-14, the refrigerant conduit 22 is represented by dotted lines and is arranged to provide the particular arrangement shown in the FIG. 4 through 14. More specifically, when elements of the invention, such as two sections, are subsequently described as being "in sequence" the outlet of the first so described section is coupled to the inlet of the second so described section by refrigerant conduit 22. Connections to atmosphere are shown by fittings 23. The fitting 23 has a self-sealing quick disconnect coupling on one end and an opening to atmosphere at the other end.

FIG. 4 shows a first arrangement of the present invention for evacuating the storage tank and the refrigerant conduit of a low pressure refrigeration system 100. This first means for arranging the system 10 includes a sequence of the low pressure refrigeration system 100, the liquid section 24, the condenser section 70, the storage tank 12, the vapor section 40, and the pump section 60. Each of the elements of the sequence is linked by refrigerant conduit 22 and the pump section 60 includes a connection to atmosphere by a fitting 23.

Figure 5:
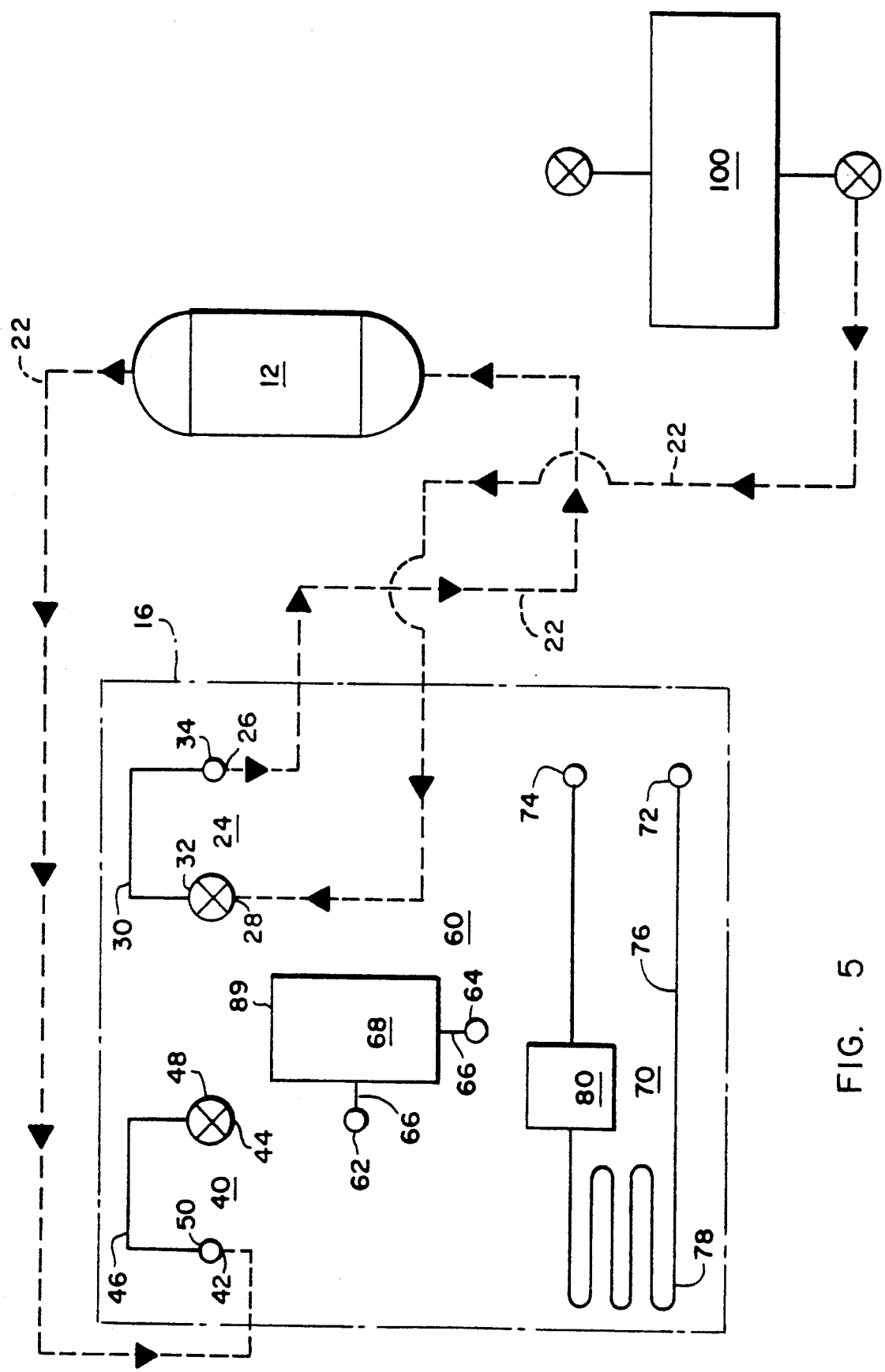
FIG. 5 shows a second circuit arrangement of the present invention arranged to pressure force liquid refrigerant from a low pressure refrigeration system to a storage tank.

FIG. 5 shows a second arrangement of the present invention to pressure force liquid refrigerant from the low pressure refrigeration system 100 to the storage tank 12 using the pressure differential between the low pressure refrigeration system 100 and the storage tank 12. This second means for arranging the system 10 includes a sequence of low pressure refrigeration system 100, the liquid section 70, the tank 12, and the vapor section 40. Each of the elements in this sequence is linked by the refrigerant conduit 22.

Figure 6:
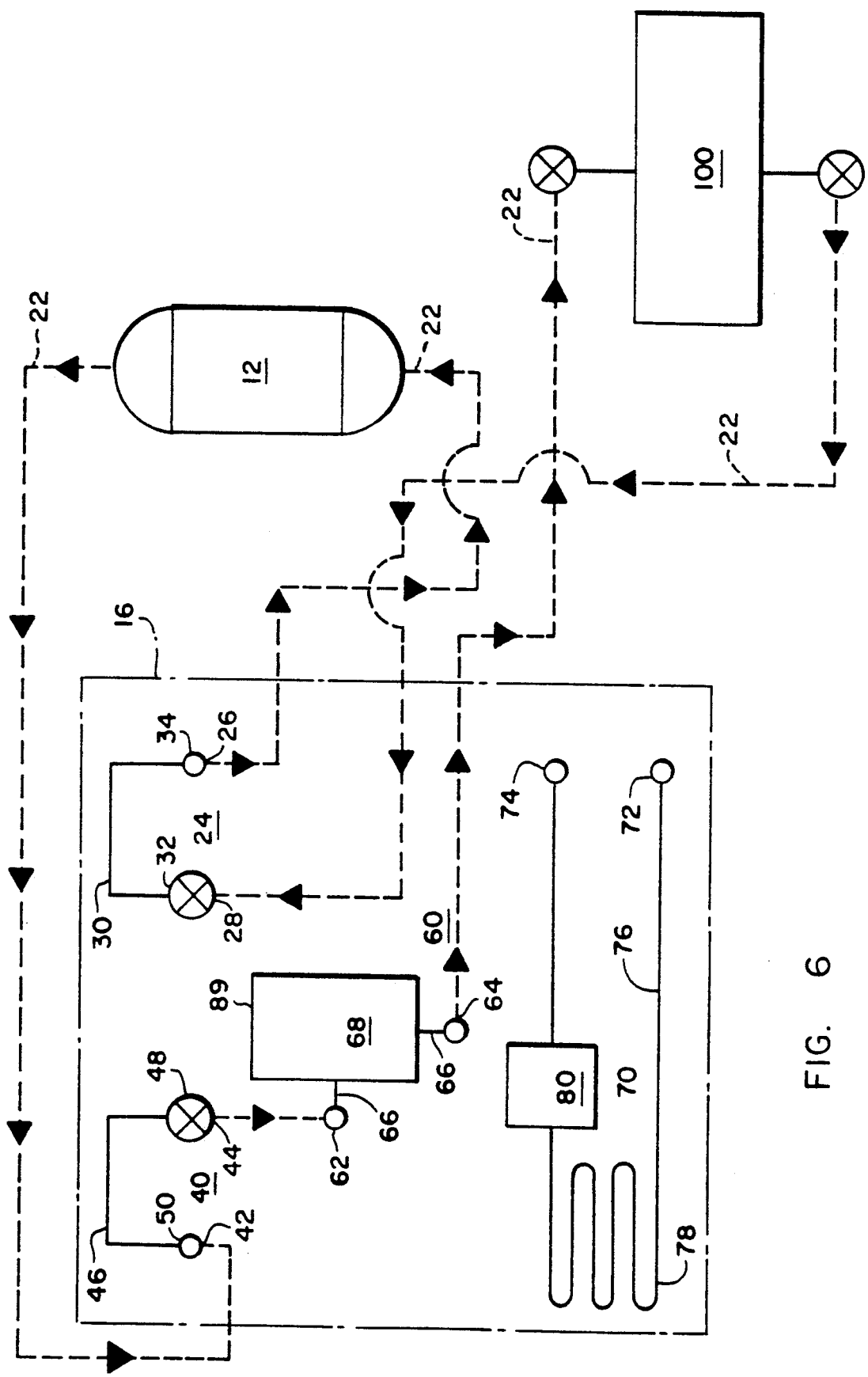
FIG. 6 shows a third arrangement of the present invention arranged to pump force liquid refrigerant from a low pressure refrigeration system to a storage tank.

FIG. 6 shows a third arrangement of the present invention used to pump force liquid refrigerant from the low pressure refrigeration system 100 to the storage tank 12 using the vacuum pump 68. This third means for arranging the system 10 includes a sequence of the low pressure refrigeration system 100, the liquid section 24, the storage tank 12, the vapor section 40, the pump section 60, and the storage tank 12. Each of the elements in this sequence is linked by the refrigerant conduit 22.

Figure 7:
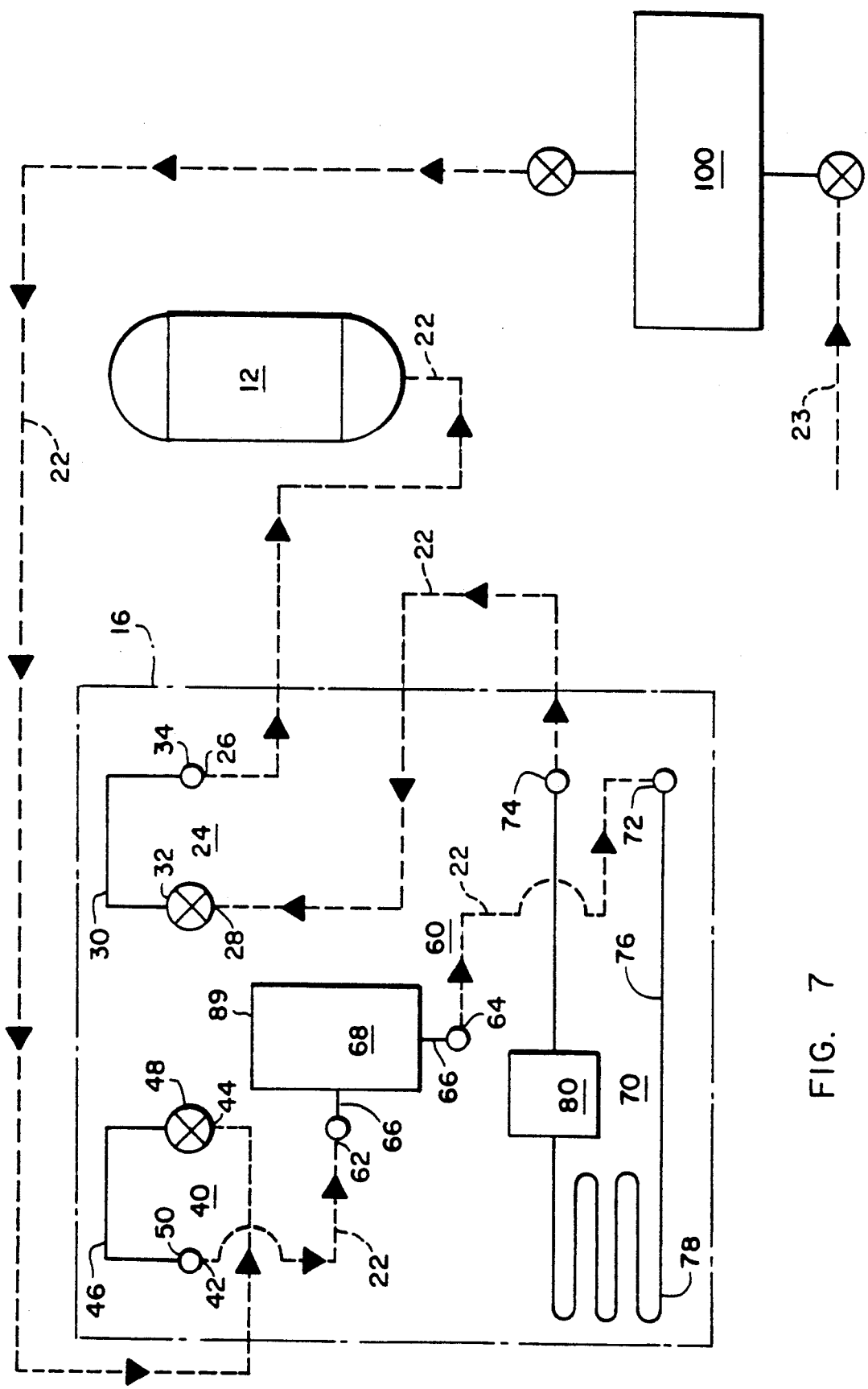
FIG. 7 shows a fourth arrangement of the present invention arranged to evacuate refrigerant vapor from a low pressure refrigeration system and the connecting refrigerant conduit.

FIG. 7 shows a fourth arrangement of the present invention for evacuating refrigerant vapor from the low pressure refrigeration system 100 and the refrigerant conduit 22. The fourth means for arranging the system 10 includes a sequence of the low pressure refrigeration system 100, the vapor section 40, the pump section 60, the condenser section 70, the liquid section 24, and the storage tank 12. Each of the elements in this sequence is linked by the refrigerant conduit 22.

Figure 8:
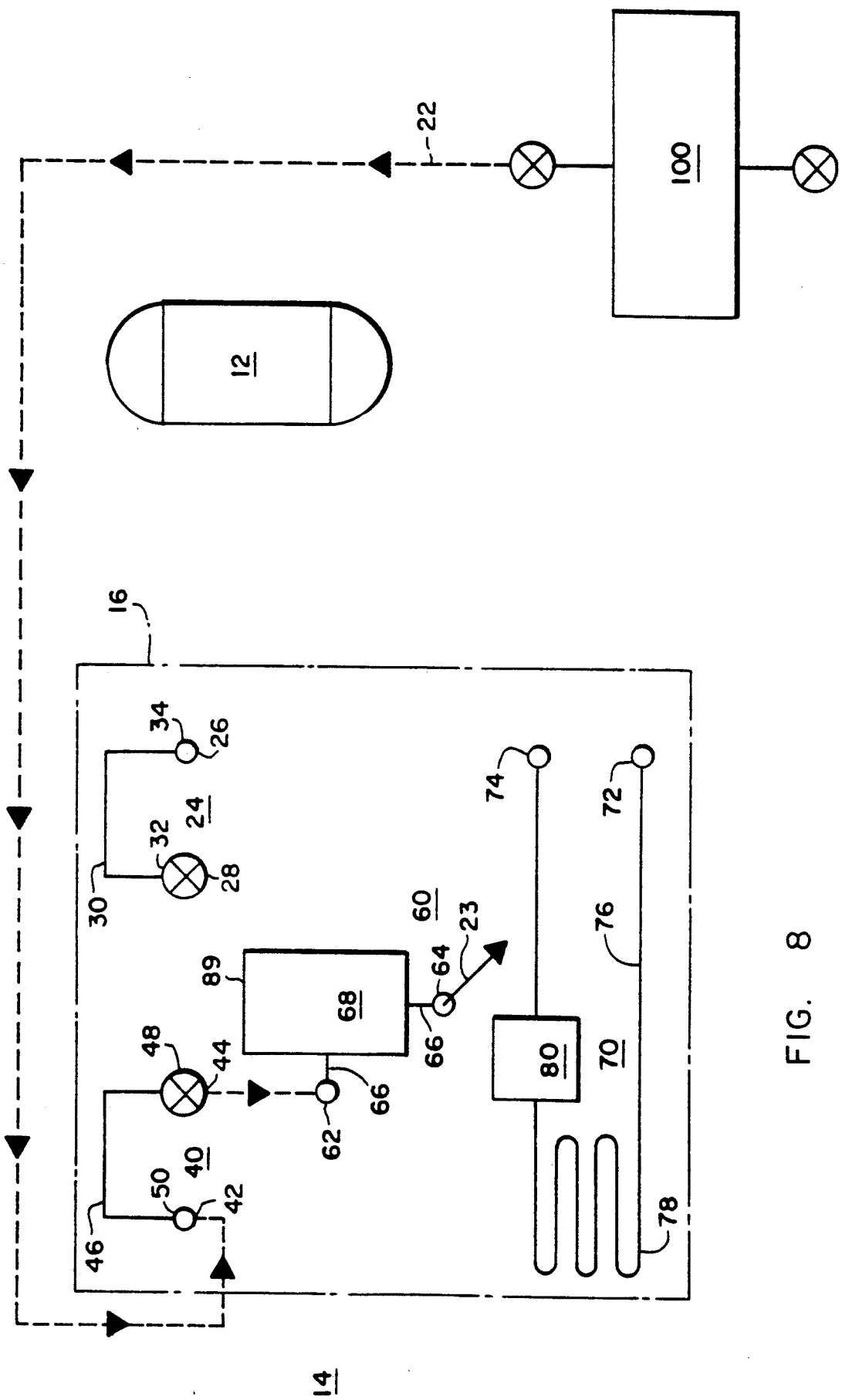
FIG. 8 shows a fifth arrangement of the present invention arranged to evacuate air from a low pressure refrigeration system.

FIG. 8 shows a fifth arrangement of the present invention for evacuating air from the low pressure refrigeration system 100. This fifth means for arranging the system 10 includes a sequence of low pressure refrigeration system 100, the vapor section 40, the pump section 60, and a discharge to atmosphere. Each of the elements in this sequence is linked by the refrigerant conduit 22 and the pump section 60 includes a connection to atmosphere by a fitting 23.

The preferred method of removing the refrigerant charge from the low pressure system 100 involves evacuating the storage tank 12 and refrigerant conduit 22 of air in accordance with the first arrangement shown in FIG. 4. Next, the pressure differential created by the first arrangement is used in the second arrangement shown in FIG. 5 to pressure force liquid refrigerant from the low pressure refrigeration system 100 to the storage tank 12. Subsequently the third arrangement shown in FIG. 6 uses the vacuum pump 68 to pump-force liquid refrigerant from the low pressure refrigeration system 100 to the storage tank 12. Finally, the fourth arrangement shown in FIG. 7 is used to remove any remaining liquid refrigerant and any vapor from the conduit 22 and the low pressure refrigeration system 100. Once the low pressure refrigeration system 100 has been serviced, the fifth arrangement shown in FIG. 8 is used to evacuate air from the low pressure refrigeration system 100. Although these first through fifth arrangements are described as steps in a method, a person of ordinary skill in the art will recognize that each arrangement can also be used individually, or in other combinations.

As noted above, the refrigerant recycle/recovery/charging system 10 also includes means for introducing fluids into the low pressure refrigeration system 100.

Figure 9:
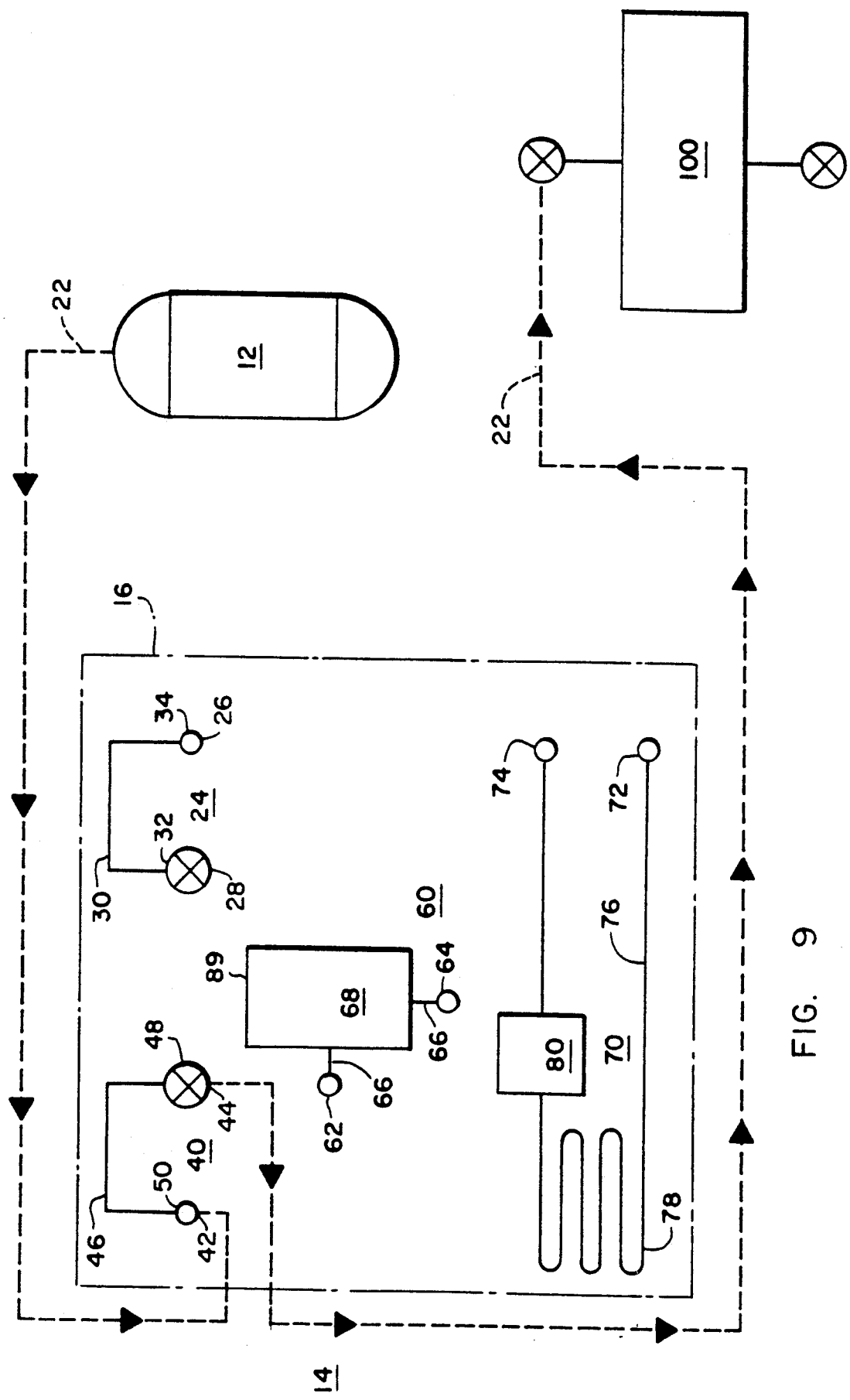
FIG. 9 shows a sixth arrangement of the present invention arranged to raise the pressure of a low pressure refrigeration system using vapor from a storage tank.

FIG. 9 shows the sixth arrangement of the present invention for raising the pressure of the low pressure refrigeration system 100 using vapor from the storage tank 12. This sixth means for arranging the system 10 includes a sequence of storage tank 12, the vapor section 40, and the low pressure refrigeration system 100. Each of the elements in this sequence is linked by the refrigerant conduit 22.

Figure 10:
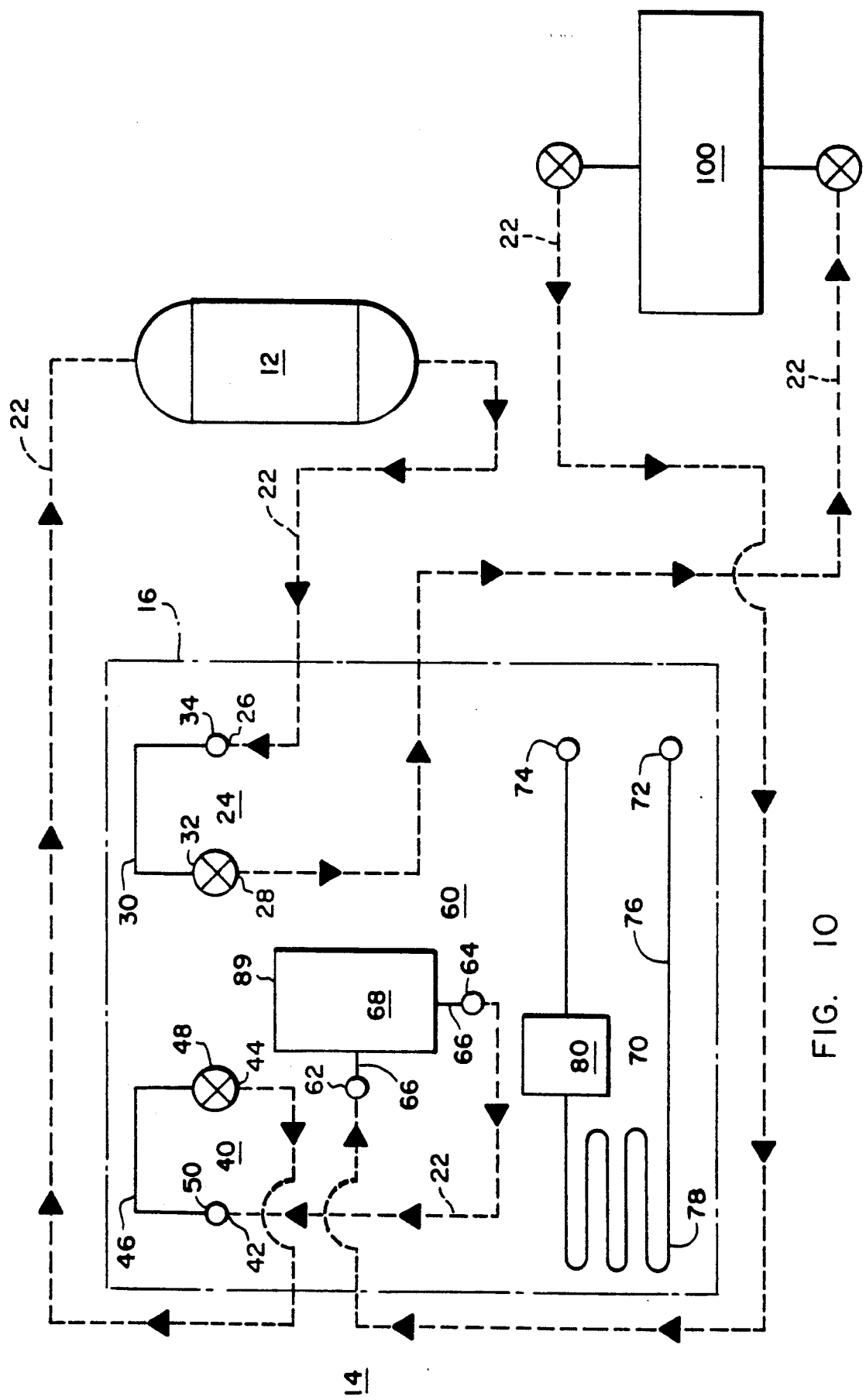
FIG. 10 shows a seventh arrangement of the present invention arranged to pump force liquid refrigerant from a storage tank to a low pressure refrigeration system.

FIG. 10 shows a seventh arrangement of the present invention for pump forcing liquid refrigerant from the storage tank 12 to the low pressure refrigeration system 100. This seventh means for arranging the system 10 includes a sequence of the storage tank 12, the liquid section 24, the low pressure refrigeration system 100, the pump section 60, the vapor section 40, and the storage tank 12. Each of the elements in this sequence is linked by the refrigerant conduit 22.

Figure 11:
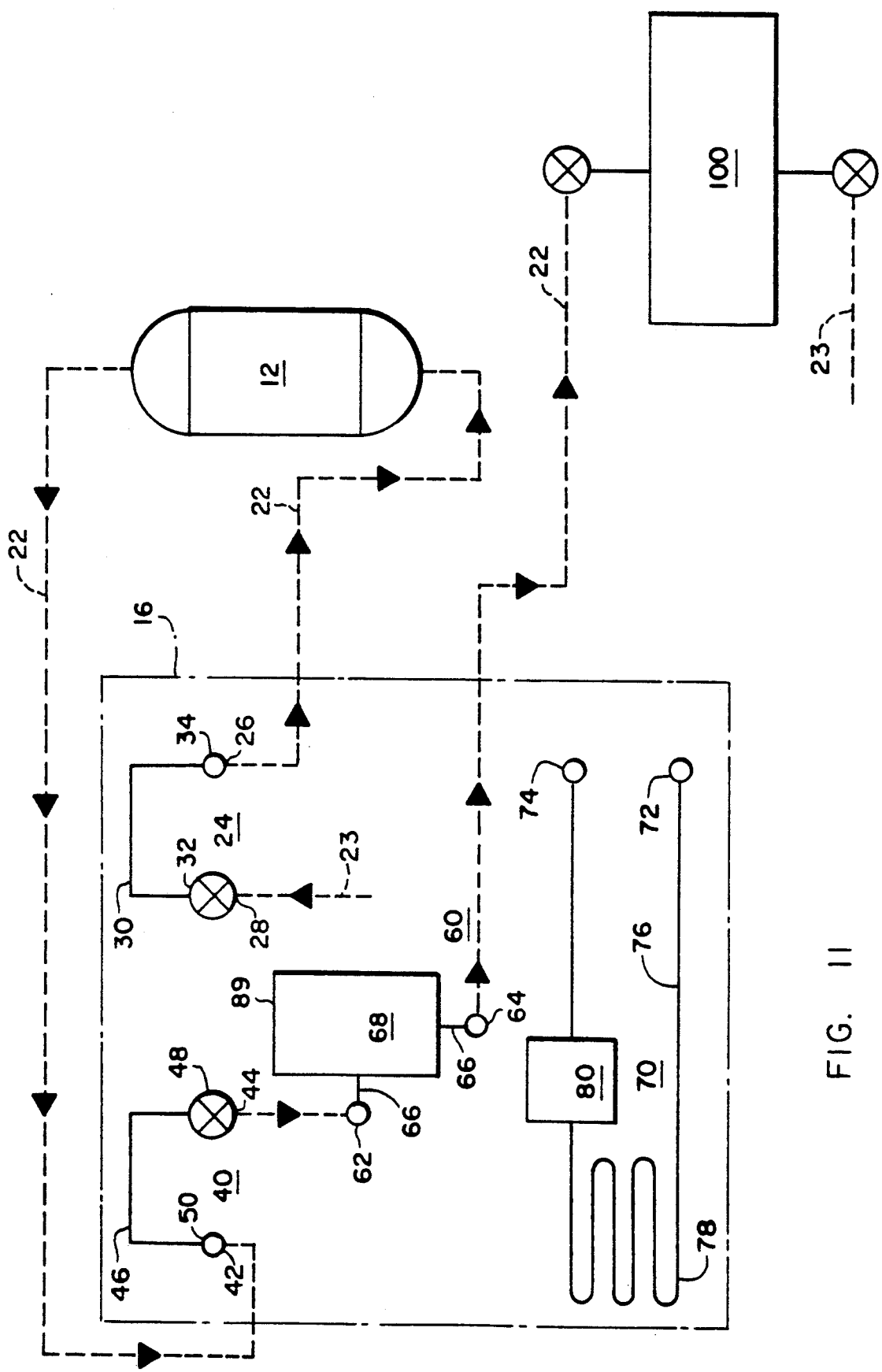
FIG. 11 shows an eighth arrangement of the present invention arranged to evacuate refrigerant vapor from a storage tank and related refrigerant conduit.

FIG. 11 shows an eighth arrangement of the present invention for evacuating refrigerant vapor from the storage tank 12 and the associated refrigerant conduit 22. This eighth means for arranging the system 10 includes a sequence of the liquid section 24, the storage tank 12, the vapor section 40, the pump section 60, and the low pressure refrigeration system 100. Each of the elements in this sequence is linked by the refrigerant conduit 22.

Figure 12:
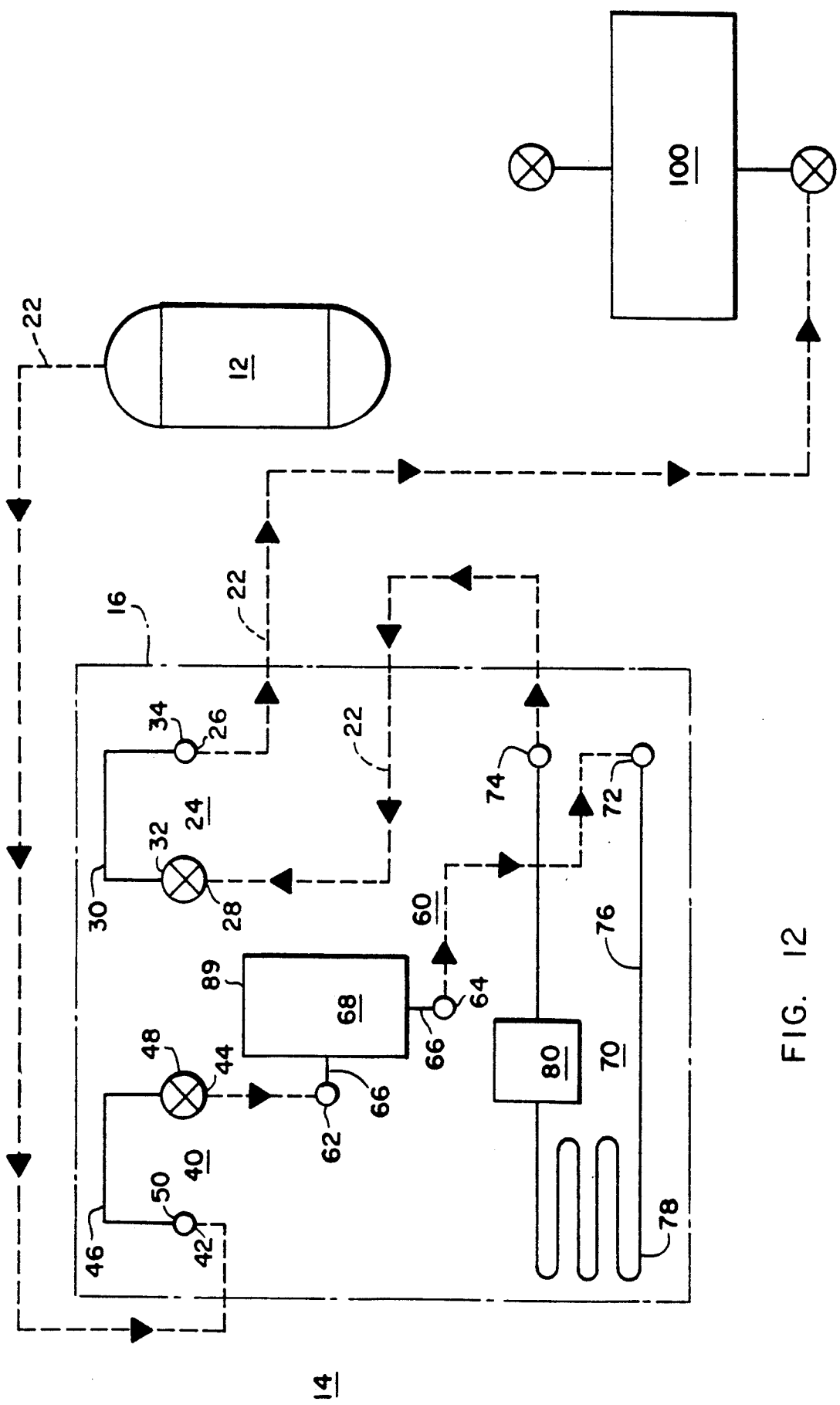
FIG. 12 shows a ninth arrangement of the present invention arranged to return refrigerant to a low pressure refrigeration system while recycling the refrigerant.

FIG. 12 shows a ninth arrangement of the present invention for returning refrigerant to the low pressure refrigeration system 100 while recycling the refrigerant. This ninth means for arranging the system 10 includes a sequence of the storage tank 12, the vapor section 40, the pump section 60, the condenser section 70, the liquid section 24, and the low pressure refrigeration system 100. In this ninth arrangement the storage tank 12 is heated by heating means such as an electric strip heater 110 wrapped around the storage tank 12. Other conventional heating means are contemplated. An internal heater is also contemplated within the storage tank 12. Each of the elements in this sequence is linked by the refrigerant conduit 22.

The present invention also includes a tenth arrangement shown in FIG. 13 for evacuating refrigerant vapor from the condenser section 70 of the present invention. This means for evacuating refrigerant vapor from a water cooled condenser 78 includes tenth means for arranging the system 10 in a sequence from the liquid section 24 through the condenser section 70, the storage tank 12, the vapor section 40, the pump section 60, and the low pressure refrigeration system 100. Each of the elements in this sequence is linked by the refrigerant conduit 22.

The preferred method of introducing refrigerant charge into the low pressure refrigeration system 100 without the recycle of refrigerant involves evacuating air from the low pressure refrigeration system 100 using the fifth arrangement shown in FIG. 8. Next, the sixth arrangement shown in FIG. 9 is used to raise the pressure in the low pressure refrigeration system 100 using vapor from the storage tank 12.

The seventh arrangement shown in FIG. 10 is then used to pump-force liquid refrigerant from the storage tank 12 to the low pressure refrigeration system 100. The eighth arrangement shown in FIG. 11 is then used to evacuate refrigerant vapor from the storage tank 12 and the refrigerant conduit 22.

The preferred method of introducing refrigerant charge into the low pressure refrigeration system 100 with the recycle of refrigerant initially involves evacuating air from the low pressure refrigeration system 100 using the fifth arrangement shown in FIG. 8. Next, the sixth arrangement shown in FIG. 9 is used to raise the pressure in the low pressure refrigeration system 100 using vapor from the storage tank 12. The ninth arrangement shown in FIG. 12 then uses the vacuum pump 68 and the strip heater 110 to boil, condense and process the refrigerant through the filter-drier 80 before returning the refrigerant through the low pressure refrigeration system 100. Finally, the tenth arrangement shown in FIG. 13 is used to evacuate refrigerant vapor from the condenser 70, the filter-drier 80, and the refrigerant conduit 22.

Although these fifth through tenth arrangements are described in the steps of these two methods of introducing refrigerant charge into a low pressure refrigeration system, a person of ordinary skill in the art will recognize that each arrangement can also be used individually or in other combinations.

FIG. 14 shows an eleventh and final arrangement of the invention for securing the system 10 after use. The means for securing the system 10 after use includes this eleventh means for arranging the system 10 in a sequence of the storage tank 12, the vapor section 40, the liquid section 24, and the pump section 60 with the pump 68 discharging to atmosphere. Each of the elements in this sequence is linked by the refrigerant conduit 22 and the pump section 60 includes a connection to atmosphere by a fitting 23.

As noted above, the dotted lines on FIGS. 4 through 14 represent the use of refrigerant conduit 22 preferably having self sealing quick disconnect couplings to allow easy rearrangement without the loss of refrigerant vapor or liquid.

What has been described is a highly versatile yet portable refrigerant recycle/recovery/charging system which is economical and provides a wide variety of applications. The great versatility of the present invention arises in part due to the lack of permanent connections between the vapor, liquid, pump, and condensing sections. The use of self-sealing, quick disconnect conduits to interconnect these sections facilitates the rearrangement of the refrigerant recycle/recovery/charging system into the arrangements detailed above. It will be apparent that further modifications and alterations of the present invention can be made, including some applications to high pressure recycle/recovery/charging systems with the substitution of appropriate valves, sensors and a vacuum pump. However, all of the above arrangements are not applicable to high pressure systems absent the addition of a compressor and an evaporator, which may not always be practical. Other modifications include rearranging the order of the vapor flow control device 48 and the vapor condition sensing device 50 within the vapor section 46 with appropriate adjustment of the vapor sensing device. Another modification also contemplates rearranging the liquid flow control device 32 and the liquid condition device 34 within the refrigerant conduit 30, as well as the rearrangement of the water cooled condenser 78 and the filter drier 80 within the condenser section 70 under certain conditions. Other modifications and alterations will readily be apparent, and all such modifications and alterations are intended to be within the spirit and scope of the following claims.

What is claimed by Letters Patent of the United States is:

1. A method of operating a portable, refrigerant recycle/recovery/charging system in recycling, recovering or charging refrigerant in a refrigeration system, the portable system comprising; a storage tank and a housing, the housing including: a liquid section having a liquid inlet, a liquid outlet and a liquid conduit connecting the liquid flow control device and a liquid condition sensing device; a vapor section having a vapor inlet, a vapor outlet, and a vapor conduit connecting the vapor inlet and the vapor outlet, the vapor conduit including a vapor flow control device an d a vapor condition sensing device; a pump section including a pump inlet, a pump outlet, and a pump conduit connecting the pump inlet and the pump outlet, the pump conduit including a pump; and a condensing section including a condensing inlet, a condensing outlet, and a condensing section including a condensing inlet, a condensing outlet, and a condensing conduit connecting the condensing inlet and the condensing outlet, the condensing conduit including a condenser;

the method including the step of removing fluids from the refrigeration system, where the removing step further sequentially includes the following steps;

first arranging the system in a sequence of the refrigeration system, the liquid section, the condenser section, the storage tank, the vapor section and the pump section;

second arranging the system in a sequence of the refrigeration system, the storage tank, and the vapor section;

third arranging the system in a sequence of the refrigeration system, the liquid section, the storage tank, the vapor section, the pump section, and the storage tank;

fourth arranging the system in a sequence of the refrigeration system, the vapor section, the pump section, the condenser section, the liquid section, and the storage tank; and fifth arranging the system in a sequence of the refrigeration system, the vapor section, the pump section, and an outlet to atmosphere.

2. The method of claim 1 further including the step of introducing fluids into the refrigeration system, where the introducing step sequentially includes the following steps;

sixth arranging the system in a sequence of the storage tank, the vapor section, and the refrigeration system;

seventh arranging the system in a sequence of the storage tank, the liquid section, the refrigeration system, the pump section, the vapor section, and the storage tank;

eighth arranging the system in a sequence of the liquid section, the storage tank, the vapor section, the pump section, and the refrigeration system; and ninth arranging the system in a sequence of the storage tank, the vapor section, the pump section, the condenser section, the liquid section, and the refrigeration system.

3. The method of claim 2 further including the step of evacuating arranging the system in a sequence of the liquid section, the condenser section, the storage tank, the vapor section, the pump section, and the refrigeration system.

4. The method of claim 3 further including the step of arranging the system in a sequence of the storage tank, the vapor section, the liquid section, and the pump section.

5. A method of operating a portable, refrigerant recycle/recovery/charging system in recycling, recovering or charging refrigerant in a refrigeration system, the portable system comprising: a storage tank; and a housing, the housing including: a liquid section having a liquid inlet, a liquid outlet and a liquid conduit connecting the liquid inlet and the liquid outlet, the liquid conduit including a liquid flow control device and a liquid condition sensing device; a vapor section having a vapor inlet, a vapor outlet, and a vapor conduit connecting the vapor inlet and the vapor outlet, and a vapor conduit including a vapor flow control device and a vapor condition sensing device; a pump section including a pump inlet, a pump outlet, and a pump conduit connecting the pump inlet and the pump outlet, the pump conduit including a pump; and a condensing section including a condensing inlet, a condensing outlet, and a condensing conduit connecting the condensing inlet and the condensing outlet, the condensing conduit including a condenser;

the method including the step of introducing fluid into the refrigeration system where the introducing step sequentially includes the following steps:

sixth arranging the system in a sequence of the storage tank, the vapor section, and the refrigeration system;

seventh arranging the system in a sequence of the storage tank, the liquid section, the refrigeration system, the pump section, the vapor section, and the storage tank;

eighth arranging the system in a sequence of the liquid section, the storage tank, the vapor section, the pump section, ad the refrigeration system; and ninth arranging the system in a sequence of the storage tank, the vapor section, the pump section, the condenser section, the liquid section, and the refrigeration system.

* * * * *

UNITED STATES PATENT AND TRADEMARK OFFICE
CERTIFICATE OF CORRECTION

PATENT NO. : 5,272,882

DATED : December 28, 1993

INVENTOR(S) : Randall L. Degier, Richard L. Groth, Stephen T. Kerr, Ralph C. Mullally, Patrick D. Pruse and Robert J. Roth It is certified that error appears in the above-indentified patent and that said Letters Patent is hereby corrected as shown below:

Claim 1, Column 8, Line 25, "an d" should read --and--.

Claim 1, Column 8, Lines 31-33, delete [section including a condensing inlet, a condensing outlet, and a condensing].

Claim 1, Column 8, Line 21, after the word "the" insert --liquid inlet and the liquid outlet, the liquid conduit including a--.

Claim 5, Column 9, Line 27, delete [and a] and insert --the--.

Claim 5, Column 10, Line 21, "ad" should read --and--.

Signed and Sealed this

Twenty-third Day of August, 1994

Attest:

BRUCE LEHMAN

*Attesting Officer*  *Commissioner of Patents and Trademarks*